UNITED STATES PATENT OFFICE.

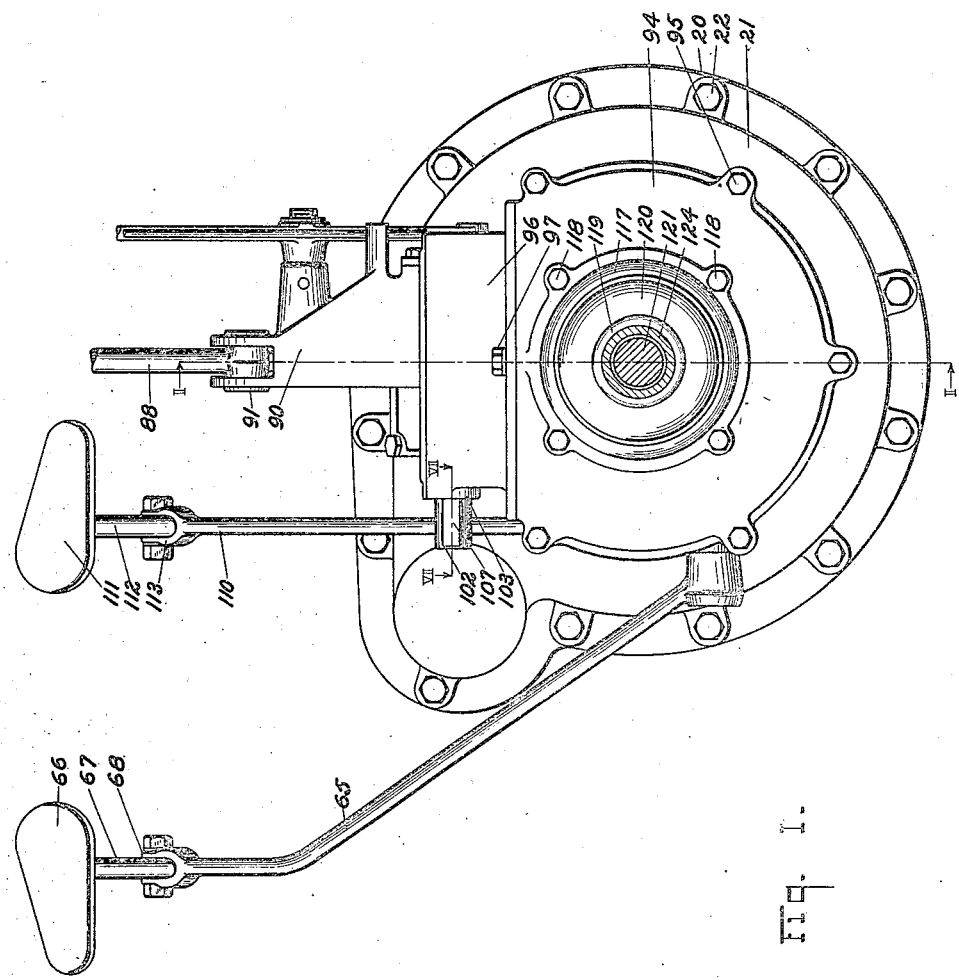

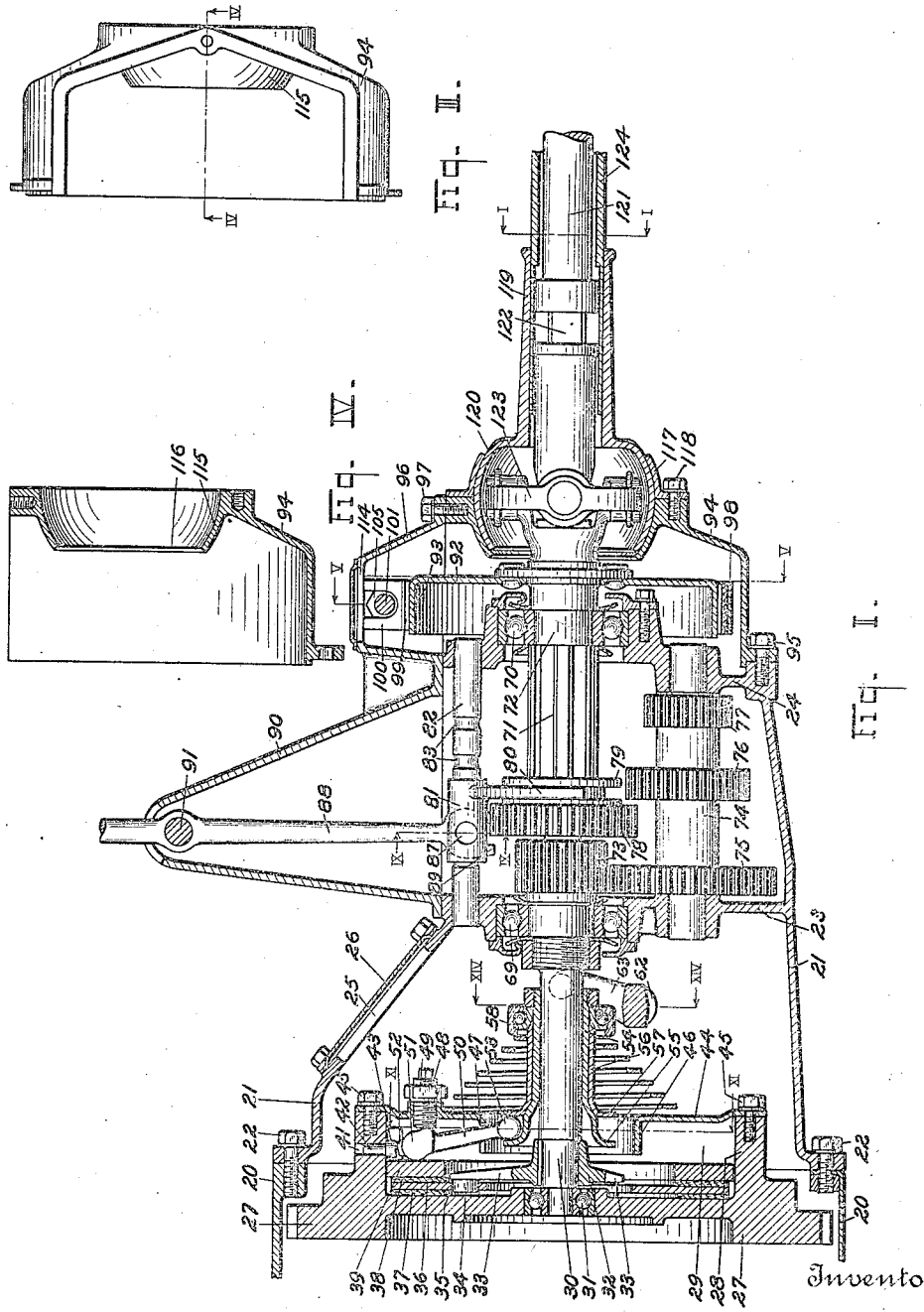

EDWARD H. BELDEN, OF TOLEDO, OHIO, ASSIGNOR, BY MESNE ASSIGNMENTS, TO THE WILLYS-OVERLAND COMPANY, OF TOLEDO, OHIO, A CORPORATION OF OHIO.

POWER-TRANSMITTING MECHANISM.

1,421,761.　　　　Specification of Letters Patent.　　Patented July 4, 1922.

Application filed July 19, 1917, Serial No. 181,556. Renewed February 6, 1922. Serial No. 534,804.

*To all whom it may concern:*

Be it known that I, EDWARD H. BELDEN, a citizen of the United States, residing at Toledo, in the county of Lucas and State of Ohio, have invented certain new and useful Improvements in Power-Transmitting Mechanism, of which I declare the following to be a full, clear, and exact description.

This invention relates to power transmitting mechanism for automobiles and has for its object to provide driving mechanism between the rear axle and engine embodying an improved construction co-operating to insure a maximum degree of efficiency in the operation of the automobile.

Another object of the invention is to provide an improved propeller shaft housing and universal connection between the housing and transmission casing.

Another object of the invention is to provide in combination, a clutch, transmission and propeller shaft with an improved housing for the latter having universal connection with an extension on the rear end of the transmission casing.

Further objects, and objects relating to economies of manufacture and details of construction, will definitely appear from the detailed description to follow.

I accomplish the objects of my invention by the devices and means described in the following specification. My invention is clearly defined and pointed out in the appended claims.

A structure constituting a preferred embodiment of my invention is illustrated in the accompanying drawing, forming a part of this specification, in which—

Figure I is a vertical, sectional view, taken substantially on the line I—I of Figure II, and showing the power transmitting mechanism in end elevation.

Figure II is a longitudinal, sectional view through the structure, said section being taken substantially on the line II—II of Figure I.

Figure III is a top plan view of the housing for the transmission brake, showing the socket for receiving the ball joint on the forward end of the tube surrounding the propeller shaft.

Figure IV is a detail, sectional view, taken substantially on the line IV—IV of Figure III.

In the drawings, similar reference numerals refer to similar parts throughout the several views, and the sectional views are taken looking in the direction of the little arrows at the ends of the section lines.

The power transmitting mechanism is housed within a casing 21, which is secured to the rear end of the engine casing 20, by means of the bolts 22. Said casing 21 is provided with partition walls 23 and 24 and has an opening 25 in the forward part thereof, which is closed by a cover 26 secured thereto in any suitable manner, so that, when said cover 26 is removed, access may be had to the clutch in order to adjust and repair the same. The fly wheel 27, which is driven from the engine has a rearwardly projecting annular flange 28, forming within the fly wheel the chamber 29, in which the clutch mechanism is housed. The shaft 30 has its forward end journaled in the fly wheel 27, a bearing 31 being provided for that purpose, as shown in Figure II of the drawing. The hub 32 of a spider is secured to the shaft 30, said spider having the radiating arms 33, which are provided with laterally projecting pins 34, which fit in openings 35 provided in the disc 36, which is disposed within the chamber 29 and has a central opening through which the shaft 30 extends. A disc of suitable friction material 37 is disposed between the fly wheel 27 and the disc 36, and a disc of suitable friction material 38 is disposed between the disc 36 and a ring 39 disposed within the chamber 29 as shown in Figure II of the drawing. Laterally projecting ears 40 are formed on said ring 39 and radial openings 41 are provided in the flange 28 of the fly wheel, in which the stems 42 of pins provided with heads 43 are disposed. Said heads 43 are normally disposed between the ears 40 on the ring 39 so that the rotation of said disc 39 relative to the fly wheel is prevented by means of pins 42. A plate 44 is secured to the outer edge of the flange 28 by means of the bolts 45, said plate being provided with the central inwardly projecting flange 46, which is slotted at 47 to accommodate the levers for operating the clutch. Said plate 44 thus forms a cover for the chamber 29 within which the clutch discs are housed. A plurality of bolts 48 are adjustably mounted in said plate 44 and provided with lock nuts 49 to hold them in their adjusted position, there being one of these bolts for each of the levers for operating the clutch discs, so that the engagement of the clutch discs may be adjusted from time to time in the manner which will be hereinafter described.

To operate the clutch discs, we provide three levers 50 each of which has a head 51, having an upwardly extending projection 52, which is normally disposed between the ears 40 on the ring 39. Head 51 is so disposed as to engage ring 39 and fulcrum on the end of one of the bolts 48. Each of said levers is provided with a tail 53, which is disposed between the flanges 55 and 57, provided on the forward end of the sleeves 54 and 56. The sleeve 54 is slidably mounted on the shaft 30 and is provided at its forward end with the outwardly extending flange 55, and the sleeve 56 is fixed on the sleeve 54, so as to move therewith, and provided with the laterally extending flange 57, said flanges 55 and 57 forming an annular space between them, which receives the tails 53 of the levers 50 for operating the clutch. A bearing ring 58 is mounted on the end of the sleeve 56, being provided with a bearing 59, and is adjustably held thereon by means of the ring 60, threaded on to the sleeve 54. A spring 61 is compressed between the plate 44, which covers the chamber 29 in the fly wheel, and said ring 58, said spring 61 serving to normally hold the sleeves 54 and 56 in their rearward position so as to hold the clutch discs in engagement with each other. A rock shaft 62 is journaled in the casing 21 and provided with a pair of arms 63, each provided with a laterally extending finger 64, which engages the ring 58 to force the sleeves 54 and 56 forward, in order to release the clutch discs. Said rock shaft 62 is operated by means of the arm 65, which is secured thereto and extends upwardly and laterally and carries at its upper end the pedal 66, provided with the stem 67, adjustably mounted in the fork 68 at the forward end of the arm 65. Said stem 67 extends through the dash of the car so that the pedal 66 is above the dash in the usual manner.

Bearings 69 and 70 are provided in the partition walls 23 and 24 respectively, and the main transmission drive shaft 72 is provided with the splines 71 and carries the gear 73, which may mesh with the gear 75, fixed on the shaft 74, journaled in the partitions 23 and 24, and carrying the gears 76 and 77, the gears 75, 76 and 77 differing in size and number of teeth so as to provide the different speeds for the transmission. The gear 78 is slidably mounted on the shaft 72 and carries a collar 79, which is adapted to be engaged by the fork 80 of the gear shifter mechanism. Shaft 82 is mounted in the partition walls 23 and 24 of the casing, and provided with a plurality of notches 83 and a sleeve 81 is slidably mounted on said shaft 82 and carries the fork 80 for engaging the collar 79 as described above. The sleeve 81 also has a laterally projecting chamber, in which is housed a compression spring and a ball (not shown), which is adapted to engage any one of the notches 83 and acts as a detent to prevent unintentional or inadvertent movement of said sleeve relative to the shaft 82. An opening 87 is provided in the sleeve 81, opposite the chamber, so as to provide for the insertion and removal of the spring and the ball through said opening. The gear shift lever 88 is provided with a fork 89, which embraces the laterally extending chamber (not shown), and by means of which the sleeve 81 is moved on the shaft 82. The cap for the transmission casing 21 is provided with the housing 90 for the gear shift lever 88, which is journaled on the cross pin 91, carried by said housing 90.

The brake hub 92 is secured to the main transmission drive shaft 72, at a point in the rear of the partition wall 24, said brake hub being provided with a laterally extending flange 93, which is enclosed by the transmission brake casing 94 secured to the rear end of the transmission casing by means of the bolts 95. The cap for this casing, which has the gear shift lever housing 90, as has already been described, also has the portion 96 which forms a cap for the housing enclosing the transmission brake and is secured to the casing by means of the bolts 97. The brake band 98 extends around the flange 93 of the brake hub 92 and the brackets 99 are secured to the brake band 98 at the ends thereof and are provided with the upwardly extending forks 100, within which is disposed the stem 101, of a plunger, which is slidably mounted in a boss (not shown), formed in the cap 96 for the transmission brake housing, said plunger being connected with the brake lever 110 in any suitable manner, said lever carrying at its upper end the pedal 111 having the stem 112 which is adjustably secured to the forked end 113 of the lever.

On the rear end of the casing 94, there is formed the concave hemispherical ring or socket 115, having a central opening 116 therethrough, through which the main transmission drive shaft 72 extends. The forward end of the casing 119 enclosing the propeller shaft is provided with a hemispherical ball 120, which is disposed within said socket 115, and secured therein by means of the concave flanged ring 117, secured to the casing 94 by means of the bolts 118, so that said rings 117 and 115 form a socket receiving the ball shaped head on the casing 119, in a manner which is well understood. The propeller shaft 121 is connected to the universal joint 123, by means of the slip joint 122, said universal joint being disposed within the ball 120 at the forward end of the casing 119, and the casing 124 for the main portion of the propeller shaft is connected by slip joint with the portion 119, so that no thrust is transmitted thereto.

From the description of the parts given above, the operation of my device should be very readily understood. The fly wheel 27 is driven by the engine shaft in the usual manner and is coupled to the drive shaft 30 through the clutch mechanism, which is housed within the chamber 29 formed by the annular flange 28 on the fly wheel. The forward end of the shaft 30 is journaled in the fly wheel in the bearing 31. The disc 36 travels with the shaft 30, since it is secured thereto by means of the laterally projecting pins 34, carried by the radiating arms 33 of the spider hub 32, which is secured to the shaft 30, said pins engaging in openings 35 provided in the disc 36. The ring 39 travels with the fly wheel 27, since the engagement of the heads 43 of the pins 42, which are carried in radial openings provided in the flange 28 of the fly wheel, between the ears 40 on the ring 39, prevents rotation of said ring 39, relative to the fly wheel, but permits a lateral movement of said ring relative to the fly wheel. It will be thus seen that the disk 36 turns with shaft 30 but is movable laterally relative thereof while the ring 39 turns with the fly wheel 27 but is movable laterally thereof. Discs of friction material are interposed between the ring 39 and the fly wheel 37 so that, as said ring 39 is forced toward the fly wheel, it compresses the friction discs 37 and 38 and squeezes them together against the disc 36, so that said disc will be caused to travel with the fly wheel. The spring 61 normally tends to hold the clutch in engagement so that the shaft 30 moves with the fly wheel, since said spring 61 tends to force the sleeves 54 and 56, which are movably mounted on the shaft 30, rearwardly, so as to move rearwardly the tails 53 of the levers 50 for operating the disc. These levers fulcrum on the ends of the bolts 48, which are threaded through the plate 44. The head 51 of each lever is provided with a part which fulcrums on the end of the bolt 48 and the head 51 has another portion which engages the ring 39 so that there is a lever action, which tends to move said ring toward the fly wheel to compress the discs together and form a driving connection between the fly wheel and the shaft 30. The engagement of the projection 52 between the ears 40 on the ring 39 prevents movement of the lever 50, relative to the ring 39. Bolt 48 may be adjusted in the plate 44, so as to vary the fulcrum of the lever 50 and thus vary the tension of the clutch. One end of the spring 61 engages the plate 44 and the other end engages the bearing ring 58, which is mounted on the sleeve 56, and supported so as to rotate relative thereto. To throw the clutch out of engagement, the sleeves 54 and 56 can be pushed forwardly by means of the rock shaft 62, in the usual manner, and this will carry the tails 53 of the levers forwardly, so as to release the pressure on the ring 39, and permit the fly wheel to rotate without driving the shaft 30.

The speed change mechanism is of the usual type, comprising the sliding gear 78 and the gears 75, 76, 77 mounted on the countershaft 74. The sleeve 81 is shifted through the fork 89 of the lever 88, so that the sleeve is shifted bodily, carrying with it the fork 80 to move the gear 78 on the shaft 72.

The transmission brake comprises a hub 92, which is secured to the main transmission drive shaft, at a point just in advance of the universal joint 123 connecting said drive shaft with the propeller shaft, which extends rearwardly to the rear axle, and said transmission brake is enclosed within the housing 94, which is secured to the rear end of the speed change gear casing. The brake is operated by means of a sliding wedge (not shown), which is suitably connected with the brake lever 110 carrying the pedal 111 as shown in Figure I.

The transmission drive shaft is connected with the propeller shaft 121, which is connected to the rear axle, through the universal joint 123 and the slip joint 122. The propeller shaft is surrounded by the casing 124, which is connected by a slip joint with the casing 119, having the ball 120 which has a universal mounting in the socket 115 and is held therein by the flange 117. The power transmission mechanism is therefore mounted in and carried by a casing which is secured to the engine casing, so that there is a unit power plant assembly, and the casing for the propeller shaft has a universal mounting on this casing at its forward end.

I am aware that the particular embodiment of my invention, which I have here shown and described, is susceptible of considerable variation without departing from the spirit of my invention, but I have found that this particular embodiment is desirable from many standpoints, and, therefore, I desire to claim the same specifically as well as broadly, as indicated by the appended claims.

Having thus described my invention, what I claim as new and desire to secure by Letters Patent is—

1. In a device of the class described, the combination of a driven member; a shaft; a clutch connecting said driven member and said shaft; transmission mechanism driven by said shaft; a propeller shaft; a universal joint connected with said transmission mechanism and connected with said propeller shaft by a slip joint; a casing housing said transmission mechanism and secured to the rear end of the engine casing; a transmission brake; a casing housing said transmission brake and secured to the rear end of said transmission casing; a casing for said propeller shaft provided with a ball shaped housing at its forward end, said transmission brake casing being provided with a socket adapted to receive said ball shaped housing; and a concave ring secured to said transmission brake housing and adapted to engage said ball shaped housing, whereby the casing for the propeller shaft has a universal connection with the rear end of said transmission brake housing.

2. In a device of the class described, the combination of a driving member; a shaft; a clutch connecting said driving member with said shaft; transmission mechanism; a propeller shaft connected with said driven shaft by said transmission mechanism, said connections including a universal joint; a housing for said propeller shaft; a transmission brake; a casing for said transmission secured to the rear end of the engine casing; a housing for said transmission brake secured to the rear end of said transmission casing; and a universal connection for the forward end of said propeller shaft housing on the rear end of said transmission brake housing, said universal joint being disposed within said universal connection.

3. In a device of the class described, the combination of a driven member; a shaft; a clutch connecting said driven member with said shaft; a transmission shaft; transmission mechanism; a propeller shaft connected with said transmission shaft by means of a universal joint; a casing for said transmission mechanism; a housing connected to the rear end of said transmission casing; and a housing for said propeller shaft, having universal connection with the rear end of said last named housing, the center of said universal connection being co-incident with the center of said universal joint.

In testimony whereof I affix my signature.

EDWARD H. BELDEN.